(12) United States Patent
Ebner (10) Patent No.: US 12,469,259 B2
(45) Date of Patent: Nov. 11, 2025

(54) SYSTEM AND METHOD TO CREATE OBJECT DETECTION SCAN PLANS

(71) Applicant: CareAR Holdings LLC, Norwalk, CT (US)

(72) Inventor: Fritz Ebner, Pittsford, NY (US)

( * ) Notice: Subject to any disclaimer, the term of this patent is extended or adjusted under 35 U.S.C. 154(b) by 547 days.

(21) Appl. No.: 17/933,930

(22) Filed: Sep. 21, 2022

(65) Prior Publication Data

US 2024/0096066 A1    Mar. 21, 2024

(51) Int. Cl.
*G06V 10/774* (2022.01)
*G06V 20/64* (2022.01)
*G06V 20/70* (2022.01)

(52) U.S. Cl.
CPC ............ *G06V 10/774* (2022.01); *G06V 20/64* (2022.01); *G06V 20/70* (2022.01)

(58) Field of Classification Search
CPC ........ G06V 20/20; G06V 20/64; G06V 20/70; G06V 10/764; G06V 10/774; G06V 10/82
See application file for complete search history.

(56) References Cited

U.S. PATENT DOCUMENTS

2021/0097341 A1* 4/2021 Marco .................... G06V 20/64

OTHER PUBLICATIONS

Groemping, Ulrike; "Fractional Factorial Designs with 2-Level Factors" Package FrF2; Version 2.2-23; FrF2. catlg128, BsMD, DoE.wrapper; May 9, 2022; 81 Pages.

* cited by examiner

*Primary Examiner* — Matthew C Bella
*Assistant Examiner* — Janice E. Vaz
(74) *Attorney, Agent, or Firm* — Fleit Intellectual Property Law; Jon Gibbons (57) ABSTRACT

A system for generating a scanning list of objects to be scanned for creating an image data set for use in object detection training. A list of the objects to be scanned is received. An initial set of object combinations of the objects to be scanned is enumerated. A modified set of object combinations is generated by applying rules to each object combination in the initial set of object combinations, the rules including identifying known objects based on inclusion of other objects in the combination, and the rules including identifying unscannable objects based on inclusion of other objects in the combination. The scanning list is generated by selecting object combinations from the modified set of object combinations until all objects to be scanned appear at least once in the scanning list.

15 Claims, 6 Drawing Sheets

SYSTEM AND METHOD TO CREATE OBJECT DETECTION SCAN PLANS

TECHNICAL FIELD

The present teachings relate generally to augmented reality and, more particularly, to systems and methods for creating scanning lists of objects to be scanned (scan plans) for use in object detection.

BACKGROUND

Augmented reality (AR) is an interactive experience with a real-world environment where real-world objects are enhanced with computer-generated information. Computer-generated information can be both constructive (i.e., overlaid and additive) and destructive (i.e., masking). AR typically incorporates a combination of real and virtual worlds, real-time interaction, and 3D registration of virtual and real-world objects.

Object detection (also referred to as AR object recognition) associates a digital model to a real-world object to that it can be identified and manipulated in a virtual context. In this way, users in an AR system can interact with a real-world object that is being simulated. This could include, for example, adjusting the object (e.g., opening or closing parts, etc.) or making virtual annotations (e.g., overlayed instructions, identify parts, etc.).

Before a user can interact with a real-world object in the AR context, that real-world object needs to be scanned so that a digital model (e.g., simulated 3D object) can be created. However, one first has to know which objects and states of the real-world object to scan (e.g., is door on a printer open or closed, etc.). Determining the smallest number of scanning sessions for collecting data is a problem and has in the past been performed manually.

Therefore, it would be beneficial to have an alternative system and method for creating object detection scan plans.

SUMMARY

The needs set forth herein as well as further and other needs and advantages are addressed by the present embodiments, which illustrate solutions and advantages described below.

One embodiment of a system according to the present teachings includes, but is not limited to, a computing system adapted to receive a list of the objects to be scanned. The computing system is adapted to enumerate an initial set of object combinations of the objects to be scanned. The computing system is adapted to generate a modified set of object combinations by applying rules to each object combination in the initial set of object combinations, the rules including identifying known objects based on inclusion of other objects in the combination, and the rules including identifying unscannable objects based on inclusion of other objects in the combination. The computing system is adapted to generate the scanning list by selecting object combinations from the modified set of object combinations until all objects to be scanned appear at least once in the scanning list.

In one embodiment, each of the objects to be scanned has different states. The rules include marking known object states based on states of other objects in the combination, and the rules include marking unscannable objects based on states of other objects in the combination.

In one embodiment, the computing system is adapted to generate the scanning list by selecting combinations from the modified set of state combinations until all states of all parts appear at least once in the scanning list.

In one embodiment, the different states comprise an open state and a closed state.

In one embodiment, the objects to be scanned are parts of a product.

In one embodiment, the computing system is adapted to enumerate the initial set of state combinations using fractional factorial design of experiment with resolution III or IV.

In one embodiment, the computing system is adapted to enumerate the initial set of state combinations, generate a modified set of state combinations, and generate the scanning list multiple times, and to select a selected scanning list having a least amount of sets.

In one embodiment, the computing system is adapted to reorder the scanning list to make it more efficient for scanning.

In one embodiment, the computing system comprises a plurality of processors in communication over a network.

One embodiment of an object model for object detection according to the present teachings includes, but is not limited to, the scanning list generated by the system according to the present teachings. The computing system is adapted to receive images from scans of the objects to be scanned in accordance with the scanning list. The computing system is adapted to generate the object model by training an object detector to identify the objects using a labeled image data set of the images and using deep learning object detection neural networks.

One embodiment of an augmented reality system according to the present teachings includes, but is not limited to, a computing system having an object model, the object model generated by: enumerating an initial set of object combinations of objects to be scanned; generating a modified set of object combinations by applying rules to each object combination in the initial set of object combinations, the rules including identifying known objects based on inclusion of other objects in the combination, and the rules including identifying unscannable objects based on inclusion of other objects in the combination; generating a scanning list by selecting object combinations from the modified set of object combinations until all objects to be scanned appear at least once in the scanning list; generating the object model by training an object detector to identify the objects using a labeled image data set of the images from scans of the objects in accordance with the scanning list. The computing system is adapted to establish a communication session between the computing system and a user device. The computing system is adapted to receive an image from the user device. The computing system is adapted to identify objects in the image using the object model. The computing system is adapted to transmit an annotation of the image to the user device for presentation.

In one embodiment, each of the objects to be scanned has different states. The rules include marking known object states based on states of other objects in the combination, and the rules include marking unscannable objects based on states of other objects in the combination. The computing system is adapted to generate the scanning list by selecting combinations from the modified set of state combinations until all states of all parts appear at least once in the scanning list.

In one embodiment, the computing system is adapted to enumerate the initial set of state combinations, generate a modified set of state combinations, and generate the scanning list multiple times, and to select a selected scanning list having a least amount of sets.

In one embodiment, the augmented reality system comprises a support platform and the identified objects are parts of a product that is being supported.

In one embodiment, the computing system is adapted to provide self-guidance support of the product comprising instructional information.

In one embodiment, the computing system is adapted to provide tasks for troubleshooting support of the product, and the computing system is adapted to detect whether a task has been completed.

In one embodiment, the system further comprises a database of workflows. The computing system is adapted to select a selected workflow from the database of workflows using an identification of the product. The selected workflow includes instructions provided to the user device.

One embodiment of a method according to the present teachings includes, but is not limited to, receiving a list of the objects to be scanned; enumerating an initial set of object combinations of the objects to be scanned; generating a modified set of object combinations by applying rules to each object combination in the initial set of object combinations, the rules including identifying known objects based on inclusion of other objects in the combination, and the rules including identifying unscannable objects based on inclusion of other objects in the combination; generating the scanning list by selecting object combinations from the modified set of object combinations until all objects to be scanned appear at least once in the scanning list.

In one embodiment, each of the objects to be scanned has different states. The rules include marking known object states based on states of other objects in the combination, and the rules include marking unscannable objects based on states of other objects in the combination. The generating the scanning list includes selecting combinations from the modified set of state combinations until all states of all parts appear at least once in the scanning list.

In one embodiment, the enumerating the initial set of state combinations, generating a modified set of state combinations, and generating the scanning list are done multiple times, and a selected scanning list is selected having a least amount of sets.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first," "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, it is noted that none of the appended claims or claim elements are intended to invoke 35 U.S.C. 112(f) unless the words "means for" or "step for" are explicitly used in the particular claim.

Augmented reality (AR) has many different uses including, for example, as part of a support platform. When computer hardware or other physical equipment is not working correctly, a service call is typically placed to a service provider so that remediation can be performed by a support professional (e.g., knowledge expert). However, service calls and follow-up visits can be expensive and impact customer downtime. Using AR, service professionals may provide real-time access to expertise to customers, employees, field workers, etc.

Consumer applications such as FaceTime™, WhatsApp™, Skype™, etc. may be used to bridge the gap for providing visual context for support professionals. However, these are limited to the professional being able to see what the person in the field is showing via a mobile device. Even in these instances, help and guidance is provided verbally, which typically results in longer and inefficient calls.

AR may be used to enhance real-world objects with computer-generated information. As a basic example, a camera on a smartphone can be used to capture an image of a user's environment and present that image on the smartphone's display. Text, annotations, etc. may be overlayed on the image to label certain objects and/or provide other relevant information. In addition to visual enhancements, AR presentations may use other sensory modalities such as auditory, haptic, somatosensory and olfactory modalities to present relevant information to a user, although not limited thereto.

An AR-based support platform may simplify how enterprises provide access to knowledge experts for customers, employees, field workers, etc. The platform can provide live interaction, self-guided interactive instruction, and contextual insights, although not limited thereto. In some embodiments, the technology enables service professionals (e.g., field service, customer service, and IT Service teams) to access different modes of assistance, such as live interaction via a human expert resource, self-guidance ranging from a simple note to instructional steps to prebuilt 3D computer-aided design (CAD) animations, and contextual insights of data in the user's field of view from objects based on Internet of Things (IoT) integrations to various data sources.

The support platform can be enhanced with features such as analytics and dashboards of usage activity, content, and geo-location across the enterprise, although not limited thereto. Additionally, the single platform can be used to create, capture, and tag content. Tagged content may comprise, for example, images of objects, video recordings with audio of the service call session, and audio to text transcription of the service call session. Tagged session content can be analyzed to gain intelligence on associations across object detection and type, incidents, and resolutions. Furthermore, the platform may be accessible across various types of computing devices including, without limitation, desktop computers, tablets, mobile computers, laptops, mobile phones, virtual assistants, smart glasses, drones, etc.

An AR support platform can be used to provide users with instruction workflows that help a user to perform tasks. Tasks can include validation steps, where the system can help detect whether the desired result of the task has been completed. A "desired result" (or "end state") may be a special case of what can be termed "object states" (e.g., has object door been opened, has part been replaced, etc.). An object state can be any detection of an object which can be differentiated from other states. For example, an object state might comprise a door which is open or closed, or a switch which is on or off, etc.

Object states may be detected using a computer vision approach which employs deep learning networks. Object states may be used to confirm that a task has been accomplished, for example if the back door of a printer has been opened, or if a toner drum has been removed. However, the notion of object state can be thought of as the 'context' of the object that allows an identification or understanding of a state of the object.

In AR service workflows in particular, there is a need to decode information for a non-expert user. Sometimes that information is coded as text (e.g., static placards or dynamic LCD panel). OCR may be used and applied for such use cases. Zones can be used to help extract relevant information based on the location where the information should be contained.

Any AR system, including a support system, uses a scan plan for collecting data about real-world objects of interest (e.g., a product that is being supported and its object-parts). This data can be used to train object detectors for identifying the real-world objects/states.

As one skilled in the art would appreciate, software systems exist for collecting data on objects used to train object detectors. For example, software (e.g., Create App) may be used to image an object with a bounding box and identify attributes of an object. Scans can collect information about the object. Before annotating an object in the AR context, for example, the object and its states can be identified and scanned in order to train an object detector.

In one embodiment, modeling an object may begin with planning phase to list all of objects to be scanned (e.g., product parts), states, and views. Annotations can be created for various objects, states, views, etc. Such annotations can be used later in the AR context when the associated object/state/view is present.

When an object is scanned according to a scan plan of the present teachings, annotations can be verified to assure that the annotations are appropriate for various views. Then a training phase may train the model with the information. Finally, testing and publishing phases may be employed. One skilled in the art appreciates that the scan plans according to the present teachings may be used with various known systems and methods.

There are complicating factors in creating a "scan plan," which may include various permutations of objects/states. When an object is in a particular state you may not be able to see (or scan) a different object. For example, when the front door of a printer is open, you may not be able to see (or scan) a bypass tray, when front door is closed, you may not be able to see (or scan) a toner cartridge, etc.

Another complicating factor is that when an object is in a particular state, then a different object must also be in some particular state. For example, when a printer toner cartridge is removed, then the toner lock must be unlocked, when a printer back door paper transport is open, the transport levers must be unlocked, etc.

Such complicating factors need to be kept in mind since each object must be identified and annotated appropriately by an object detection system. These can be used to create a set of "rules."

A simple example of a scan plan includes the following objects: printer (neutral); front door (open, closed); scanner (open, closed). A scan plan may look like the following:

| Printer (neutral) | Front door (closed) | Scanner (closed) |
| Printer (neutral) | Front door (open) | Scanner (open) |

A more complicated example includes the following objects: printer (neutral); front door (open, closed); bypass tray (open, closed). In this example, when the front door is open it blocks the bypass tray. A scan plan may look like the following:

| Printer (neutral) | Front door (closed) | Bypass tray (closed) |
| Printer (neutral) | Front door (open) | Cannot scan |
| Printer (neutral) | Front door (closed) | Bypass tray (open) |

It can be appreciated that there may be different rules, such that when one object (e.g., part) is in a certain state it affects another object, such as the ability to see (or scan) it:

| | When | is | then cannot see (scan) |
|---|---|---|---|
| 1 | Front door | Closed | Lock |
| 2 | Front door | Closed | Toner |

|   | When | is | then cannot see (scan) |
|---|------|-----|------------------------|
| 3 | Front door | Closed | Drum |
| 4 | Front door | Open | Bypass tray |
| 5 | Front door | Open | Paper tray |
| 6 | Toner | In | Drum |
| 7 | Bypass tray | Open | Paper tray |

And rules may get more complicated, such that when one object is in a certain state it means that another object must be in a certain state:

|   | When | is | then object (part) | must be |
|---|------|-----|--------------------|---------|
| 1 | Toner | Out | Lock | Open |
| 2 | Drum | Out | Lock | Open |

The present teachings address the problem of creating an efficient scan plan even when these complicating factors (rules) are present.

First a set of combinations can be enumerated. This may include, for example, fractional factorial design of experiments (DoE).

In statistics, fractional factorial designs are experimental designs consisting of a chosen subset (fraction) of the experimental runs of a full factorial design. Fractional designs may be expressed using the notation $l^{k-p}$, where l is the number of levels of each factor investigated, k is the number of factors investigated, and p describes the size of the fraction of the full factorial used. Formally, p is the number of generators, assignments as to which effects or interactions are confounded, i.e., cannot be estimated independently of each other. A design with p such generators is a $1/(l^p) = l^{-p}$ fraction of the full factorial design. For example, a $2^{5-2}$ design is ¼ of a two level, five factor factorial design. Rather than the 32 runs that would be required for a full $2^5$ factorial experiment, the experiment requires only eight runs.

An important property of a fractional design is its resolution or ability to separate main effects and low-order interactions from one another. Formally, the resolution of the design is the minimum word length in the defining relation. The most important fractional designs are those of resolution III, IV, and V. Resolutions below III may not be useful and resolutions above V may be wasteful in that the expanded experimentation has no practical benefit in most cases—the bulk of the additional effort goes into the estimation of very high-order interactions which rarely occur in practice.

One skilled in the art appreciates the use of fractional design and resolutions and it is not necessary to go into further detail of those concepts here.

Applied to the presented teachings, two-level designs from DoE may be used to achieve a minimal set (e.g., resolution III or resolution IV). Resolution IV may be preferred as it may have better performance and be more convenient. With resolution III, it may run out of rows before getting the initial subset, meaning that the initial set of combinations will not be as robust.

Second, restriction rules may be applied to each set (also referred to as a "row" or "run") in the set of combinations in the state enumeration. All states that must be in a specific state when the respective object is detected may be marked. All states that are unscannable when respective object is detected may also be marked.

Third, for the resulting set of state combinations, select a row until all objects appear at least once. Ignore runs where all states are already represented.

Fourth, Because Fractional Factorials can be randomly generated, and the fact that final number of "runs" is dependent on order, some factorial sets will result in smaller run count after processing. To find a minimum, we can run N samples of the prior three process steps to get near-optimal minimal result.

Following is an example of the process.

First, the initial enumeration of states has resolution IV. There are 9 objects, with 7 binary and 2 unary. The full factorial would be $2^7$ or 128 runs (experimental candidates).

|    | Scanner | Drum | Toner | Lock | PaperTray | BypassTray | FrontDoor | LCD | Printer | shouldScan |
|----|---------|------|-------|------|-----------|------------|-----------|-----|---------|------------|
| 1  | 2 | 1 | 1 | 1 | 1 | 2 | 2 | 1 | 1 | FALSE |
| 2  | 1 | 2 | 2 | 2 | 1 | 1 | 1 | 1 | 1 | FALSE |
| 3  | 1 | 1 | 1 | 1 | 2 | 1 | 2 | 1 | 1 | FALSE |
| 4  | 1 | 1 | 1 | 1 | 1 | 1 | 1 | 1 | 1 | FALSE |
| 5  | 2 | 1 | 2 | 2 | 1 | 1 | 2 | 1 | 1 | FALSE |
| 6  | 1 | 2 | 2 | 1 | 2 | 1 | 2 | 1 | 1 | FALSE |
| 7  | 1 | 1 | 2 | 1 | 2 | 1 | 2 | 1 | 1 | FALSE |
| 8  | 2 | 2 | 2 | 1 | 2 | 1 | 1 | 1 | 1 | FALSE |
| 9  | 2 | 2 | 1 | 2 | 1 | 2 | 1 | 1 | 1 | FALSE |
| 10 | 2 | 1 | 2 | 1 | 1 | 2 | 1 | 1 | 1 | FALSE |
| 11 | 1 | 2 | 2 | 1 | 1 | 2 | 2 | 1 | 1 | FALSE |
| 12 | 1 | 1 | 2 | 2 | 2 | 2 | 1 | 1 | 1 | FALSE |
| 13 | 1 | 2 | 1 | 1 | 2 | 2 | 1 | 1 | 1 | FALSE |
| 14 | 2 | 2 | 2 | 2 | 2 | 2 | 2 | 1 | 1 | FALSE |
| 15 | 2 | 1 | 1 | 2 | 2 | 1 | 1 | 1 | 1 | FALSE |
| 16 | 2 | 2 | 1 | 1 | 1 | 1 | 2 | 1 | 1 | FALSE |

A known toolkit such as "Fractional Factorial Designs with 2-Level Factors" (referred to as "Package 'FrF2'") may be used to create an initial enumeration of states according to Fractional Factorial design. Such toolkits are known to those skilled in the art. Package FrF2 was published May 9, 2022 by Ulrike Groemping at https://prof.bht-berlin.de/groemping/software/versuchsplanung/ (see also https://cran.r-project.org/web/packages/FrF2/index.html), and is incorporated by reference in its entirety.

Package FrF2 is just one way to get a subset of binary states (factors), as would be appreciated by one skilled in the art. As shown above, it provides 16 samples of the 7 binary object at resolution IV. The unary objects may be initially ignored since they will not affect the combinations.

Second, the restriction rules may be applied. A "-" means the object cannot be scanned based on the state of another object.

| | Scanner | Drum | Toner | Lock | PaperTray | BypassTray | FrontDoor | LCD | Printer | shouldScan |
|---|---|---|---|---|---|---|---|---|---|---|
| 1 | 2 | — | — | — | 2 | 2 | 2 | 1 | 1 | FALSE |
| 2 | 1 | 2 | 2 | 2 | — | — | 1 | 1 | 1 | FALSE |
| 3 | 1 | — | — | — | 1 | 2 | 2 | 1 | 1 | FALSE |
| 4 | 1 | — | 1 | 1 | — | — | 1 | 1 | 1 | FALSE |
| 5 | 2 | — | — | — | — | 1 | 2 | 1 | 1 | FALSE |
| 6 | 1 | — | — | — | — | 1 | 2 | 1 | 1 | FALSE |
| 7 | 1 | — | — | — | — | 1 | 2 | 1 | 1 | FALSE |
| 8 | 2 | 2 | 2 | 1 | — | — | 1 | 1 | 1 | FALSE |
| 9 | 2 | — | 1 | 2 | — | — | 1 | 1 | 1 | FALSE |
| 10 | 2 | 1 | 2 | 1 | — | — | 1 | 1 | 1 | FALSE |
| 11 | 1 | — | — | — | 1 | 2 | 2 | 1 | 1 | FALSE |
| 12 | 1 | 1 | 2 | 2 | — | — | 1 | 1 | 1 | FALSE |
| 13 | 1 | — | 1 | 1 | — | — | 1 | 1 | 1 | FALSE |
| 14 | 2 | — | — | — | 2 | 2 | 2 | 1 | 1 | FALSE |
| 15 | 2 | — | 1 | 2 | — | — | 1 | 1 | 1 | FALSE |
| 16 | 2 | — | — | — | — | 1 | 2 | 1 | 1 | FALSE |

Based on known interdependencies (e.g., from a planning phase), cells may be removed in a way that simplifies the design from the prior step. For example, in row 1 when the front door is closed, you may not be able to see (or scan) the toner.

In the example above, two sets of rules have been applied, namely the "must be" and "cannot see" rules discussed below. However, one skilled in the art appreciates that any number of applicable rules could be applied.

Third, runs are selected for scanning:

| | Scanner | Drum | Toner | Lock | PaperTray | BypassTray | FrontDoor | LCD | Printer | shouldScan |
|---|---|---|---|---|---|---|---|---|---|---|
| 1 | 2 | — | — | — | 2 | 2 | 2 | 1 | 1 | TRUE |
| 2 | 1 | 2 | 2 | 2 | — | — | 1 | 1 | 1 | TRUE |
| 3 | 1 | — | — | — | 1 | 2 | 2 | 1 | 1 | TRUE |
| 4 | 1 | — | 1 | 1 | — | — | 1 | 1 | 1 | TRUE |
| 5 | 2 | — | — | — | — | 1 | 2 | 1 | 1 | TRUE |
| 6 | 1 | — | — | — | — | 1 | 2 | 1 | 1 | FALSE |
| 7 | 1 | — | — | — | — | 1 | 2 | 1 | 1 | FALSE |
| 8 | 2 | 2 | 2 | 1 | — | — | 1 | 1 | 1 | FALSE |
| 9 | 2 | — | 1 | 2 | — | — | 1 | 1 | 1 | FALSE |
| 10 | 2 | 1 | 2 | 1 | — | — | 1 | 1 | 1 | TRUE |
| 11 | 1 | — | — | — | 1 | 2 | 2 | 1 | 1 | FALSE |
| 12 | 1 | 1 | 2 | 2 | — | — | 1 | 1 | 1 | FALSE |
| 13 | 1 | — | 1 | 1 | — | — | 1 | 1 | 1 | FALSE |
| 14 | 2 | — | — | — | 2 | 2 | 2 | 1 | 1 | FALSE |
| 15 | 2 | — | 1 | 2 | — | — | 1 | 1 | 1 | FALSE |
| 16 | 2 | — | — | — | — | 1 | 2 | 1 | 1 | FALSE |

Here, it is desirable to make sure that for every binary object both states (factors) can be seen at least once in the resulting set.

Fourth, the final scanning list (scan plan) is determined:

| | Scanner | Drum | Toner | Lock | PaperTray | BypassTray | FrontDoor | LCD | Printer |
|---|---|---|---|---|---|---|---|---|---|
| 1 | closed | — | — | — | closed | closed | closed | neutral | neutral |
| 2 | open | out | out | closed | — | — | open | neutral | neutral |
| 3 | open | — | — | — | open | closed | closed | neutral | neutral |
| 4 | open | — | in | open | — | — | open | neutral | neutral |
| 5 | closed | — | — | — | — | open | closed | neutral | neutral |
| 6 | closed | in | out | open | — | — | open | neutral | neutral |

In this example, only six sets (rows) were needed to make sure every object (part) is scanned. However, because the enumerated states may be randomized one may get more or less rows each time the process is performed. That is one reason why it is desirable to perform the processing multiple times (e.g., 2, 3, 4, 5, 6, 7, 8, 9, 10, 15, 20, 25, 30, 35, 40, 50, or more than 50). In this example, it was run 20 times. The resultant scan plan with the least amount of rows can be used as the ultimate scan plan.

It may also be preferable to reorder the scan plan to make it more efficient. This may be based on attributes of the objects. For example, objects that have a relatively larger effect or take longer to change states may grouped. In this way, for example, it may be preferable to scan all rows where front door is closed followed by the rows where the front door is open. A hierarchy of objects may be used for this purpose, and one skilled in the art appreciates the different ways the scan plan could be reordered for efficiencies.

Before making a scan plan, a planning phase may help obtain information about objects and their states. This information can be used to determine different combinations. The combinations can also be thought of as views. Each view may comprise objects (parts) that are scannable in at least one state of some other object. If an object is not scannable in any state of another object, then it belongs in a different view. An example of separate views is the front and back of a printer, because when looking at the back door (either open or closed) none of the objects on the fronts side are scannable.

First, identify the objects and states:

|   | Object (Part) | State type |
|---|---|---|
| 1 | Scanner | Open-closed |
| 2 | Drum | In-out |
| 3 | Toner | In-out |
| 4 | LCD | Neutral |
| 5 | Lock | Open-closed |
| 6 | Paper tray | Open-closed |
| 7 | Bypass tray | Open-closed |
| 8 | Front door | Open-closed |
| 9 | Printer | Neutral |

Then identify the restriction rules. For example, identify rules for when certain objects cannot be scanned based on the state of other objects:

|   | When | is | then cannot see (scan) |
|---|---|---|---|
| 1 | Front door | Closed | Lock |
| 2 | Front door | Closed | Toner |
| 3 | Front door | Closed | Drum |
| 4 | Front door | Open | Bypass tray |
| 5 | Front door | Open | Paper tray |
| 6 | Toner | In | Drum |
| 7 | Bypass tray | Open | Paper tray |

It also may be preferable to identify rules for when an object must be in a certain state based on the state of other objects:

|   | When | is | then object (part) | must be |
|---|---|---|---|---|
| 1 | Toner | Out | Lock | Open |

Then, the scan plan may be generated:

| Scanner | Drum | Toner | Lock | Paper tray | Bypass tray | Front door | LCD | Printer |
|---|---|---|---|---|---|---|---|---|
| 1 Closed | — | — | — | Closed | Closed | Closed | Neutral | Neutral |
| 2 Open | Out | Out | Open | — | — | Open | Neutral | Neutral |
| 3 Closed | In | Out | Open | — | — | Open | Neutral | Neutral |
| 4 Closed | — | In | Closed | — | — | Open | Neutral | Neutral |
| 5 Open | — | — | — | — | Open | Closed | Neutral | Neutral |
| 6 Open | — | — | — | Open | Closed | Closed | Neutral | Neutral |

Such systems and methods for creating scanning lists (scan plans) may be desirable for any system that utilizes a visual model. Images from a scan plan may be used to create a model that may then be used to train machine learning for object detection.

Figure 1:
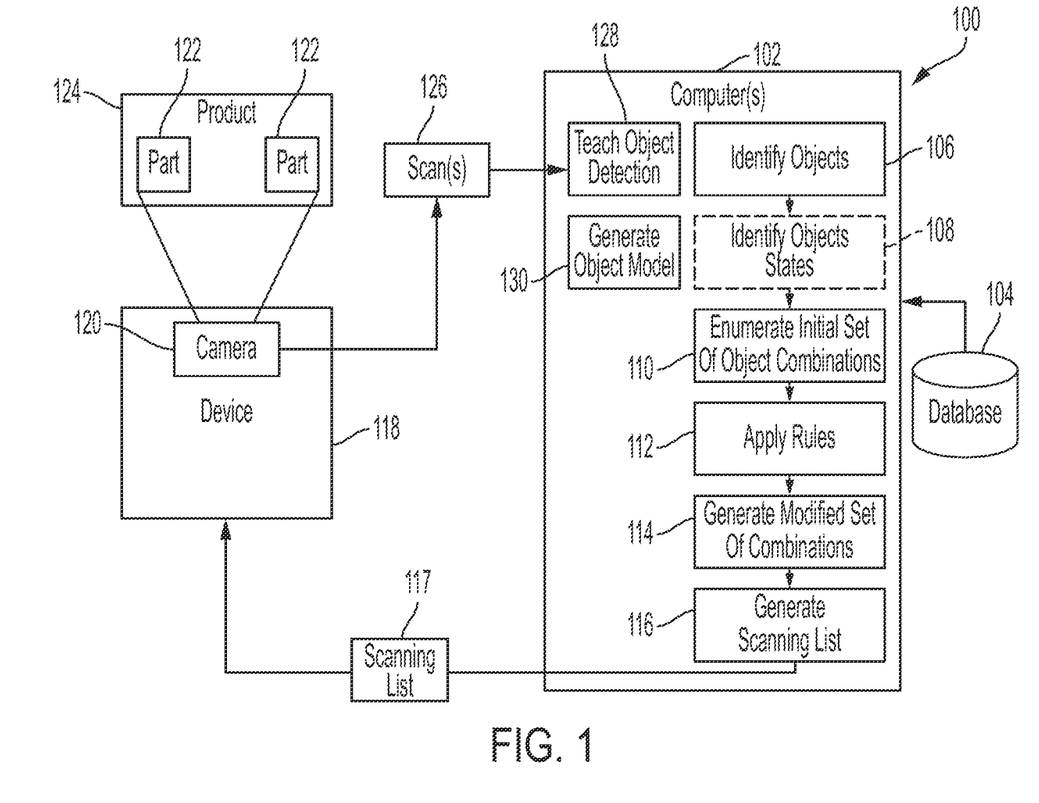
FIG. 1 is a diagram of one embodiment of a system for generating an object model according to the present teachings.

Referring now to FIG. 1, shown is a diagram of one embodiment of a system 100 for generating an object model according to the present teachings. As shown, one or more computers 102 (also generically referred to as a "computing system") may provide functionality for the present teachings. The computer/computing system 102 may include any number of computers/processors, which may communicate with each other over a network and rely on distributed computing resources. The computer 102 may typically be in the form of one or more servers executing instructions stored on computer readable media to perform functionality according to the present teachings.

The computer 102 may be in electronic communication with a datastore (e.g., database 104) that may store information on objects, states, products, training materials, support information, user interfaces, etc., as appreciated by one skilled in the art.

The computer 102 may include software executing on computer readable media that may be logically (but not necessarily physically) identified for particular functionality (e.g., functional modules). An object identifier 106 may receive a list of objects (e.g., parts of a product or other physical thing). A state identifier 108 may receive a list of states for each object.

A combination enumerator 110 may use the list of objects (and states) to enumerate an initial set of combinations. Each combination may be thought of as a view, providing a unique set of objects (and states) for that row in the enumerated set. This may be performed using fractional factorial design of experiment with resolution III or IV, as discussed above.

A rules engine 112 applies rules to the initial set of combinations. As discussed above, such rules may include "must be" and "cannot see" rules. However, one skilled in the art appreciates other rules could be applied.

Once rules are applied, a combination modifier 114 generates a modified set of combinations from the initial set of combinations. This is based at least in part on the application of the rules.

A list generator 116 generates a scanning list. This may include selecting object combinations (e.g., rows in the list of combinations) from the modified set of combinations. As described above, this may include selecting object combinations until all objects (and states) appear at least once in the scanning list.

The scanning list 117 may be sent to a computing device 118 for scanning the objects 122 in accordance with the scanning list (scan plan). The device 118 may be any type of computing device, such as a desktop computer, tablet, mobile device, etc. However, it may be preferable to be a mobile device with a built-in camera 120 for scanning the objects 122. The objects 122 may be, for example, parts of a product 124 being supported or another physical thing.

The device 118 may be used to scan the physical thing 124 and its objects 122 in accordance with the scanning list (scan plan). The scans 126 can be a labeled image data set that can be sent to the computing system 102 for use by an object detection teacher 128. The object detection teacher 128 may train deep learning object detection neural networks. This may be used by an object model generator 130 to generate an object model.

Figure 2:
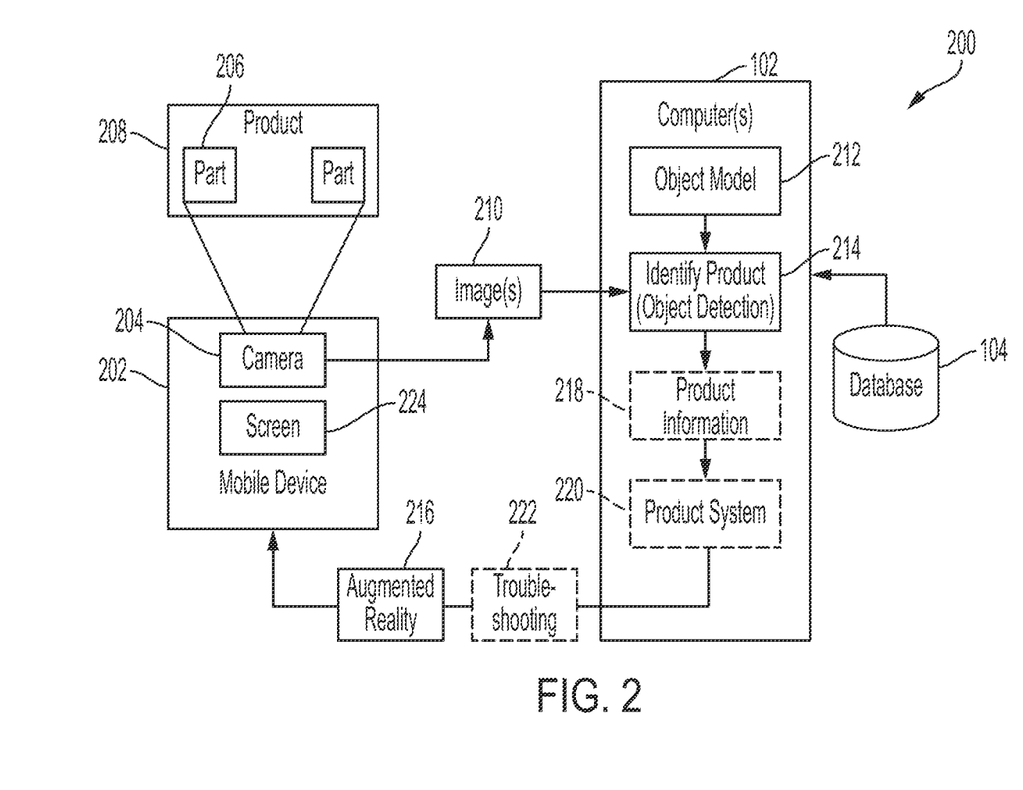
FIG. 2 is a diagram of one embodiment of an augmented reality system using the object model of FIG. 1.

Referring now to FIG. 2, shown is a diagram of one embodiment of an augmented reality system 200 using the object model of FIG. 1. A computing device 202 may use its camera 204 to scan (take a picture) of objects 206 (e.g., parts, etc.) of a physical thing 208 (e.g., a product, etc.). The computing device 202 may be the same or different device as in FIG. 1, although in a preferred embodiment it is a mobile device. In one example the physical thing 208 is a product being supported (e.g., a printer, etc.) and the objects 206 are parts of the product.

Images 210 of the objects 206 (e.g., the physical thing 208) may sent to a computing system 102 for creating augmented reality. The computing system 102 may be same or different computers, processors, etc. as shown in FIG. 1.

Using an object model 212 (e.g., object model created in FIG. 1), the computing system 102 may use a product identifier 214 to identify the physical thing 208 and/or its objects 206.

Having identified the physical thing 208 (and/or its objects 206) a digital model (e.g., simulated 3D object) of the thing 208 (or its objects 206) can be retrieved (e.g., from datastore 104) and annotated to create an augmented reality 216. For example, annotations may be shown on a screen 224 of the computing device 202 in relation to an image of the physical thing 208.

In addition, product information 218 and product support 220 may be retrieved and provide troubleshooting 222 information to the computing device 202, although not limited thereto.

Figure 3:
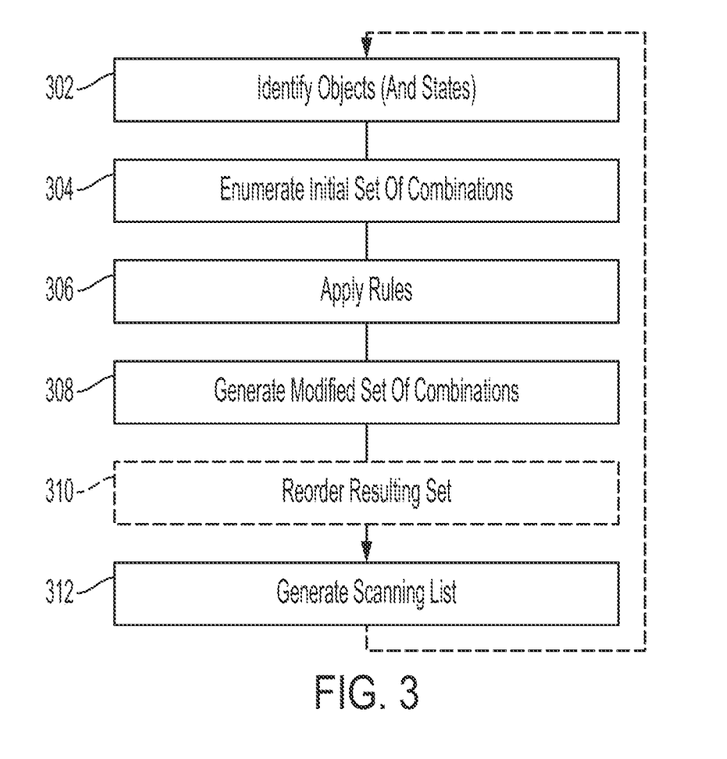
FIG. 3 is a flowchart of one embodiment of a method for generating the scanning list of FIG. 1.

Referring now to FIG. 3, shown is a flowchart of one embodiment of a method for generating the scanning list of FIG. 1. The objects (and states) of objects (e.g., the physical thing) may be identified 302. Using this, an initial set of combinations (e.g., of objects and/or states) may be enumerated 304. Rules may be applied to the combinations 306 to generate a modified set of combinations 308. It may be preferable to reorder the modified set of combinations for efficiency or other reasons 310. The scanning list (scan plan) is generated 312.

Figure 4:
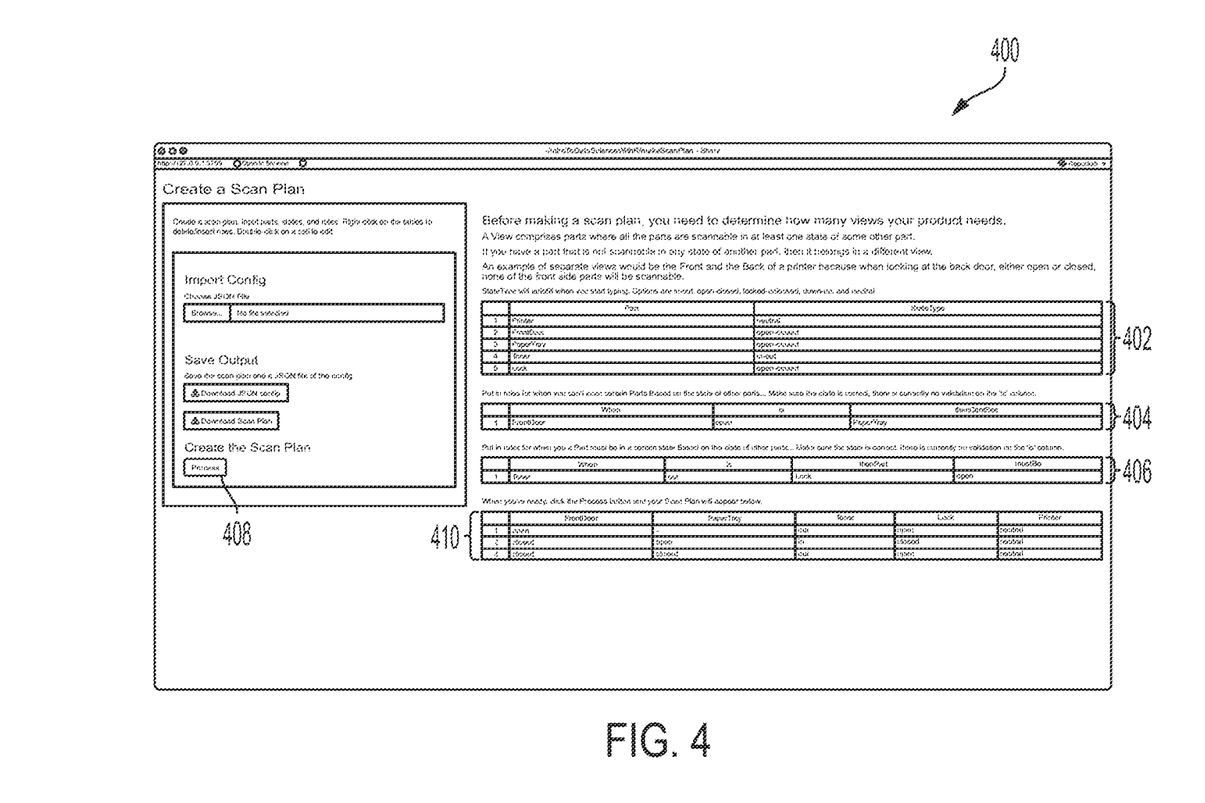
FIG. 4 is one embodiment of a user interface for the system for generating an object model of FIG. 1.

Referring now to FIG. 4, shown is one embodiment of a user interface 400 for the system 100 for generating an object model of FIG. 1. The objects (parts) and state types (states) may be identified 402. Examples of states may include neutral (i.e., not affected by states of other parts), open-closed, in-out, etc.

Rules may be defined. For example, "can't see" rules 404 may indicate that when an object is in a certain state (e.g., pursuant to its state type), another object cannot be seen. In this example, when the front door of a printer is open, the paper tray cannot be seen.

Another rule may be a "must see" rule 406. For example, when an object is in a certain state, another object must be in a certain state. In this example, when the toner is removed, the lock must be open.

Clicking on a process button 408 may generate the scan plan 410. Again, this is based on the identified objects (and states) 402 and rules 404, 406.

Figure 5:
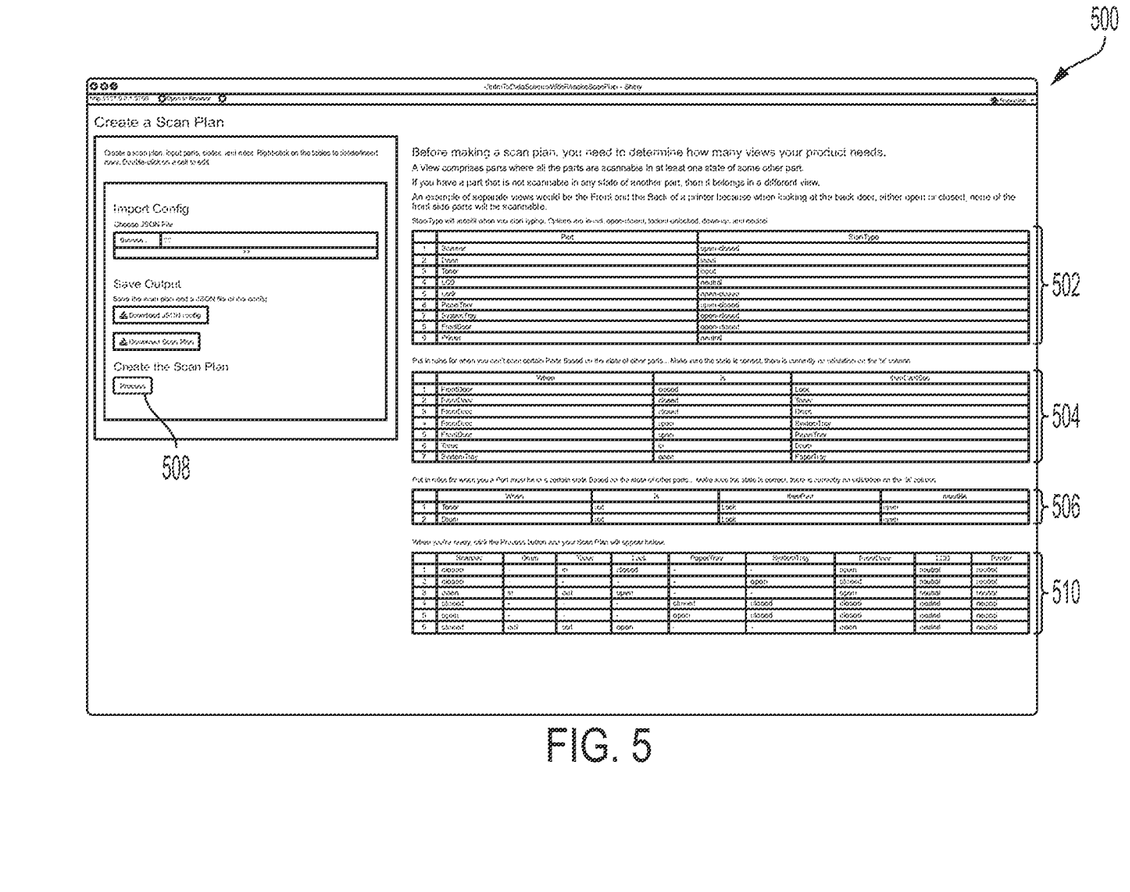
FIG. 5 is another embodiment of a user interface for the system for generating an object model of FIG. 1.

Referring now to FIG. 5, shown is another embodiment of a user interface for the system for generating an object model of FIG. 1. This example is similar to FIG. 4, but includes additional combinations. As shown, there are numerous objects (parts) and states (state types) 502, "can't see" rules 504, and "must be" rules 506. Clicking the process button 508 may again result in the scanning list (scan plan) 510.

Figure 6:
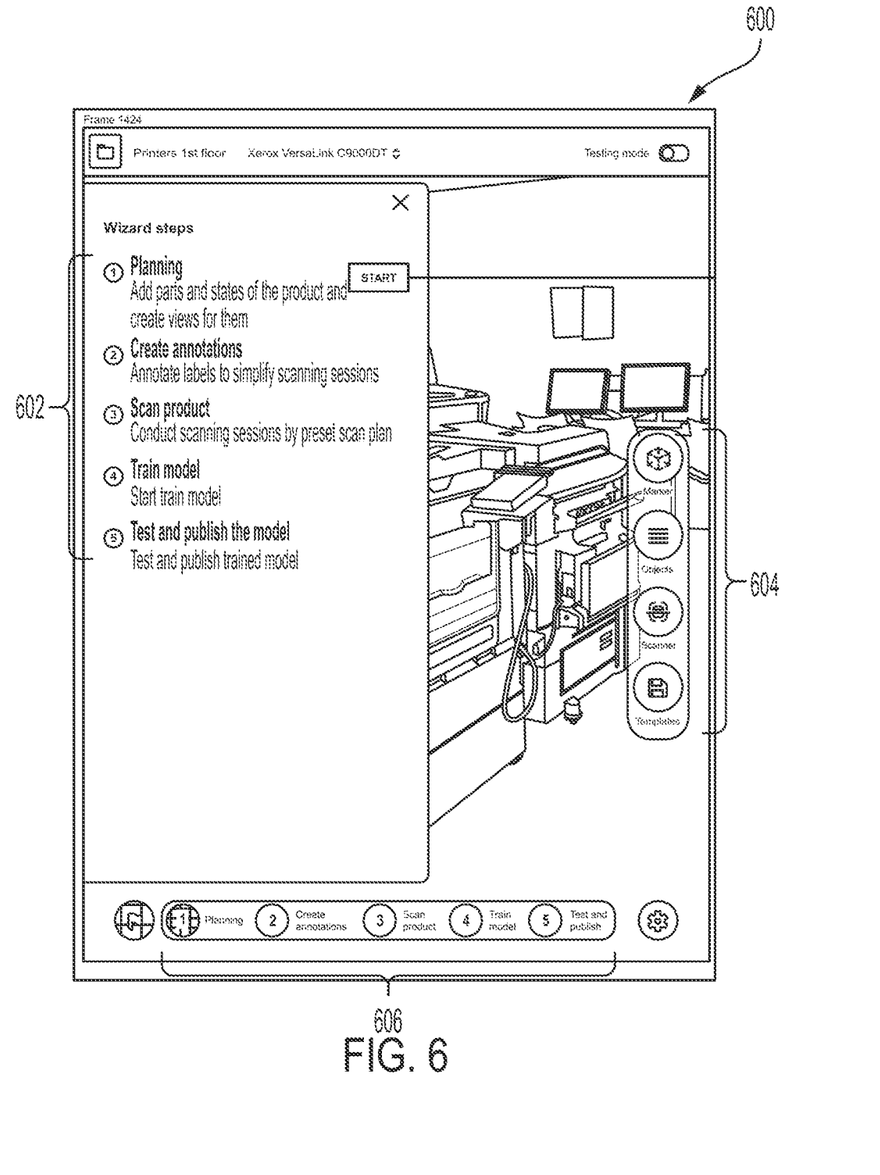
FIG. 6 is still another embodiment of a user interface for the system for generating an object model of FIG. 1.

Referring now to FIG. 6, shown is still another embodiment of a user interface for the system for generating an object model of FIG. 1. As shown, a wizard may provide different functionality 602 for generating an object model. This may include planning (e.g., identifying objects and states). Each combination may can be thought of as a view. Annotations may be created for each view (e.g., combination). The physical thing may then be scanned, a model trained, tested, and published.

The wizard may provide an indicator 606 of where the user is in the process. As shown, when in the planning phase controls 604 may provide for functionality. For example, a marker may be used to identify any object.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. An augmented reality system, comprising:
a computing system having an object model, the object model generated by:
enumerating an initial set of object combinations of objects to be scanned;
generating a modified set of object combinations by applying rules to each object combination in the initial set of object combinations, the rules including identifying known objects based on inclusion of other objects in the combination, and the rules including identifying unscannable objects based on inclusion of other objects in the combination;
generating a scanning list by selecting object combinations from the modified set of object combinations until all objects to be scanned appear at least once in the scanning list;
generating the object model by training an object detector to identify the objects using a labeled image data set of the images from scans of the objects in accordance with the scanning list;
the computing system adapted to establish a communication session between the computing system and a user device;
the computing system adapted to receive an image from the user device;
the computing system adapted to identify objects in the image using the object model; and
the computing system adapted to transmit an annotation of the image to the user device for presentation.

2. The system of claim 1, wherein:
each of the objects to be scanned has different states; and
the rules include marking known object states based on states of other objects in the combination, and the rules include marking unscannable objects based on states of other objects in the combination.

3. The system of claim 2, wherein the computing system is adapted to generate the scanning list by selecting combinations from the modified set of state combinations until all states of all parts appear at least once in the scanning list.

4. The system of claim 2, wherein the different states comprise an open state and a closed state.

5. The system of claim 2, wherein the objects to be scanned are parts of a product.

6. The system of claim 2, wherein the computing system is adapted to enumerate the initial set of state combinations using fractional factorial design of experiment with resolution III or IV.

7. The system of claim 2, wherein the computing system is adapted to enumerate the initial set of state combinations, generate a modified set of state combinations, and generate the scanning list multiple times, and to select a selected scanning list having a least amount of sets.

8. The system of claim 2, wherein the computing system is adapted to reorder the scanning list to make it more efficient for scanning.

9. The system of claim 2, wherein the computing system comprises a plurality of processors in communication over a network.

10. The system of claim 1, wherein:
   each of the objects to be scanned has different states;
   the rules include marking known object states based on states of other objects in the combination, and the rules include marking unscannable objects based on states of other objects in the combination; and
   the computing system is adapted to generate the scanning list by selecting combinations from the modified set of state combinations until all states of all parts appear at least once in the scanning list.

11. The system of claim 1, wherein the computing system is adapted to enumerate the initial set of state combinations, generate a modified set of state combinations, and generate the scanning list multiple times, and to select a selected scanning list having a least amount of sets.

12. The system of claim 1, wherein the augmented reality system comprises a support platform and the identified objects are parts of a product that is being supported.

13. The system of claim 12, wherein the computing system is adapted to provide self-guidance support of the product comprising instructional information.

14. The system of claim 12, wherein the computing system is adapted to provide tasks for troubleshooting support of the product, and the computing system is adapted to detect whether a task has been completed.

15. The system of claim 12, further comprising a database of workflows;
   the computing system adapted to select a selected workflow from the database of workflows using an identification of the product; and
   wherein the selected workflow includes instructions provided to the user device.

* * * * *